(12) United States Patent
Kim et al.

(10) Patent No.: US 7,069,010 B2
(45) Date of Patent: Jun. 27, 2006

(54) METHOD FOR DETERMINING A POSITION OF A WIRELESS COMMUNICATION ANTENNA

(75) Inventors: Young-Eil Kim, Suwon-si (KR); Do-Hoon Kwon, Seoul (KR); Ki-Ho Kim, Seoul (KR)

(73) Assignee: Samsung Electronics Co., Ltd. (KR)

( * ) Notice: Subject to any disclaimer, the term of this patent is extended or adjusted under 35 U.S.C. 154(b) by 41 days.

(21) Appl. No.: 10/830,955

(22) Filed: Apr. 23, 2004

(65) Prior Publication Data

US 2005/0003823 A1  Jan. 6, 2005

(30) Foreign Application Priority Data

Apr. 25, 2003  (KR) ............... 10-2003-0026323

(51) Int. Cl.
*H04Q 7/20* (2006.01)

(52) U.S. Cl. ............... 455/446; 455/422.1; 455/423; 455/424

(58) Field of Classification Search ............. 455/422.1, 455/446, 69, 423, 424
See application file for complete search history.

(56) References Cited

U.S. PATENT DOCUMENTS 6,625,454 B1 * 9/2003 Rappaport et al. .......... 455/446
2004/0259554 A1 * 12/2004 Rappaport et al. .......... 455/446

* cited by examiner

*Primary Examiner*—Lester G. Kincaid
*Assistant Examiner*—Dung Lam
(74) *Attorney, Agent, or Firm*—Dilworth & Barrese LLP (57) ABSTRACT

Disclosed is a method for setting a wireless communication antenna for use in the home, and more particularly to a method for setting an antenna used in local area wireless communication. The present invention provides a method for determining position of a wireless communication antenna, which is capable of providing a uniform communication environment in the home, and providing a communication environment such that interference between radio waves in a region other than the home does not occur.

7 Claims, 6 Drawing Sheets

METHOD FOR DETERMINING A POSITION OF A WIRELESS COMMUNICATION ANTENNA

PRIORITY

This application claims priority to an application entitled "METHOD FOR SETTING WIRELESS COMMUNICATION ANTENNA FOR USE IN HOME", filed in the Korean Intellectual Property Office on Apr. 25, 2003 and assigned Serial No. 2003-26323, the contents of which are incorporated herein by reference.

BACKGROUND OF THE INVENTION

1. Field of the Invention

The present invention relates to a method for determining the position of a wireless communication antenna, and more particularly to a method for determining the position of an antenna used in local area wireless communication.

2. Description of the Related Art

A mobile communication system is a representative example of a wireless communication system. The mobile communication system is capable of establishing a communication channel irrespective of the general locations of users. The mobile communication system began mainly a voice communication system, but has developed into a system capable of performing data communication due to the rapid development of communication technology and the demand of users. Current mobile communication systems in practical use are capable of transmitting a great quantity of data at high speed.

Most of todays data communication is accomplished through wired links in offices and homes. Owing to the rapid progress of wireless communication technology, home networks relying on wireless communication technology have currently come into the spotlight. Some of the main components in such home networks using wireless communication technology include terminals requiring little mobility, for example, access points of a wireless LAN (Local Area Network) or notebook computers. However, in addition to such terminals, it is desirable that terminals requiring mobility, for example, wireless devices such as web pads, should be capable of establishing data communication links at random locations in the home networks. As the mobility of the terminals in the home networks increases, improvement of quality of the wireless communication is being raised as a critical issue.

In establishing the home networks, wireless communication environments depend on the types of residences of the users. For example, a typical form of a residence in the United States is a detached house, but in Korea the typical form is an apartment. Therefore, wireless communication equipment should be set-up in the home in compliance with such wireless communication environments. On of the more important components of wireless communication equipment is an antenna. The wireless communication environments may be changed depending on where the antenna is installed.

If the location of the antenna is not properly established according to the structure of a house or apartment, a non-uniform state may occur, and the wireless communication within the house or apartment is smoothly achieved in only a particular region, but is not achieved in other regions. The state of the communication is randomly varied depending on the location of the antenna. In addition, users require methods by which the wireless communication environments are promptly adjustable. Interference can occur if the home networks are installed in every home. The interference raises problems of undesired hacking and non-smooth communication. The users need to easily determine the prime location of the antenna for smooth communication.

Studies of outdoor wireless communication environments are conducted to establish prime locations of base stations or repeaters with respect to the mobile telephones. However, studies of indoor wireless communication environments have only been conducted for determining an environment of a channel model, and not for determining optimal wireless communication environments including effects on antennas and determining prime locations for the antennas. Methods for determining the location of indoor antennas include a ray-tracing method and an image method. These methods measure the strength of a radio wave in an actual field after performing a simulation by a computer when an indoor environment is established. However, these methods require the performance of a number of measurements in order to obtain a precise solution although they provide a significantly precise simulation. These simulations and measurements must be repeated whenever an indoor structure is varied.

SUMMARY OF THE INVENTION

Therefore, the present invention solves the above problems, and it is an object of the present invention to provide a method for determining the location of a wireless communication antenna.

It is another object of the present invention to provide a method for determining the location of a wireless communication antenna, which is capable of providing uniform communication environment in the home.

It is still another object of the present invention to provide a method for determining the location of a wireless communication antenna, which is capable of minimizing interference between radio waves of different home networks.

It is still another object of the present invention to provide a method for determining the location of a wireless communication antenna, which allows smooth communication within a specific home in a crowded region such as an apartment building.

It is still another object of the present invention to provide a simple method for determining the location of a wireless communication antenna when a home network is constructed.

In accordance with an aspect of the present invention, the above and other objects can be accomplished by the provision of a method for determining the location of an antenna of a wireless communication system used a home or office network for local area wireless communication, the method comprising the steps of: drawing at least two horizontal lines and at least two vertical lines on a predetermined plan view of a building and finding central points in the middle of intersecting points between the first horizontal lines and walls presented in the plan view and between the first vertical lines and the walls; for each of the found central points, drawing second horizontal lines from the central points if the central points lie on the vertical lines and drawing second vertical lines from the central points if the central points lie on the horizontal lines; among the drawn second vertical lines and the drawn horizontal second lines, deciding two vertical lines and two horizontal lines in the middle of the drawn second vertical lines and the drawn horizontal second lines through which radio waves penetrate; and setting the antenna at a position inside a square defined by the decided vertical lines and the decided horizontal lines.

Preferably, a tilt angle of the antenna is adjusted depending on a height of the antenna from a floor of a home at which the antenna is set and a distance from the setting position of the antenna to a specific area inside the homes.

Preferably, the distance is a distance from the setting position of the antenna to a veranda inside the home.

Preferably, if there exists a structure including metal material in the setting position of the antenna, the antenna is set apart by a predetermined space from the structure.

Preferably, if the antenna is embedded in walls inside the home, the walls are excluded from the intersecting points.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Now, preferred embodiments of the present invention will be described in detail with reference to the annexed drawings. In the drawings, the same or similar elements are denoted by the same reference numerals even though they are depicted in different drawings.

In the following description made in conjunction with preferred embodiments of the present invention, a variety of specific materials such as steel concrete, wood, or glass are shown. The description of such terms has been made only for a better understanding of the present invention. Those skilled in the art will appreciate that the present invention can be implemented without using the above-mentioned specific material. In the following description, a detailed description of known functions and configurations incorporated herein will be omitted when it may obscure the subject matter of the present invention.

The present invention consists of a method to raise the strength of an indoor electric field and remove interferences of radio waves between doors. The strength of an indoor electric field is used to minimize communication disability regions in the home, the strength of an electric field is determined, and values of radio wave losses of components of a building are determined. The components of the building include structures such as walls, glass, and partitions, and steel reinforcement or H-beams. Based on the loss values of the radio waves, the number of walls through which the radio waves can penetrate, a region where antennas can not be set, etc. are determined.

The minimization of interference of radio waves between doors is achieved by modifying the procedure to determine the position of a primarily selected antenna, and then the tilt angle of the antenna is adjusted in a direction in which the interference is expected to occur if a setting height and a standard requirement of the selected antenna are determined.

Figure 1:
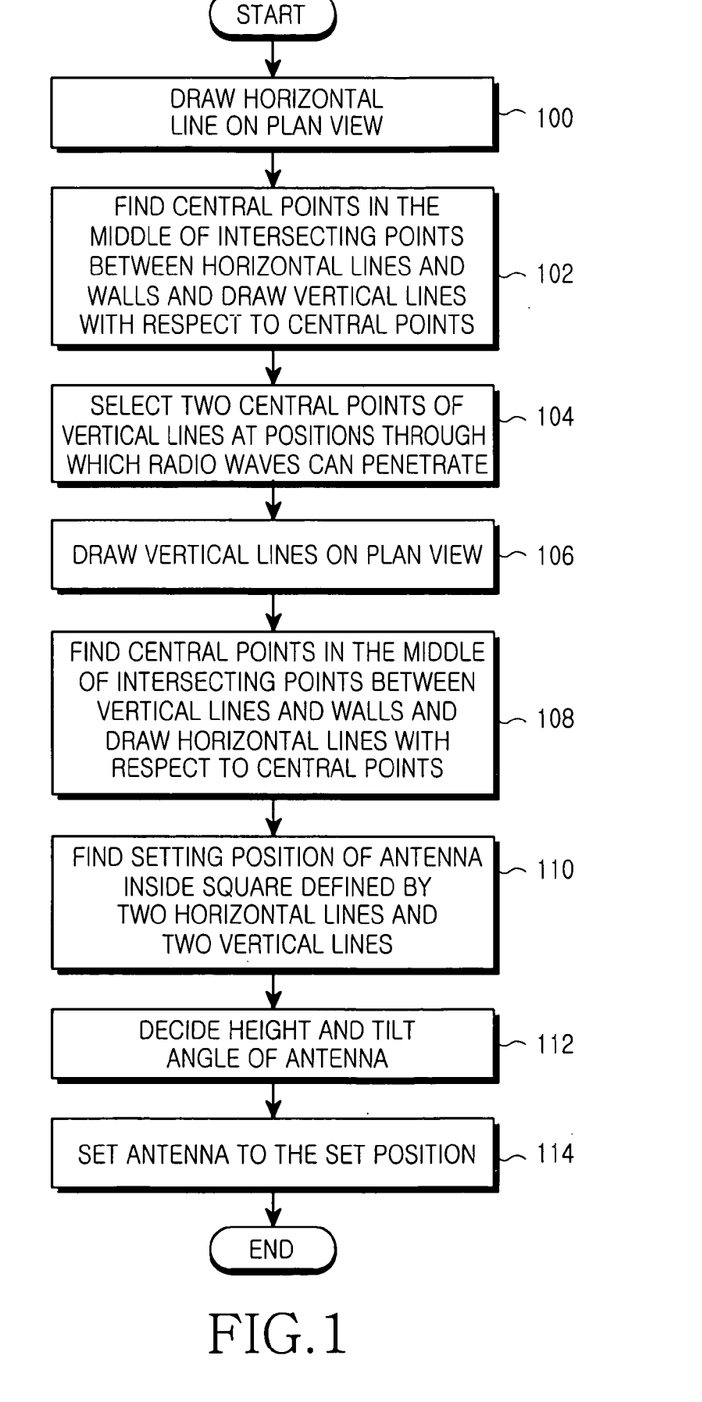
FIG. 1 is a flow chart illustrating a method for determining the location of a wireless communication antenna for use in a local network in accordance with a preferred embodiment of the present invention.

FIG. 1 is a flow chart illustrating a method for determining the position of a wireless communication antenna in accordance with a preferred embodiment of the present invention.

A person attempting to determine a prime position of the wireless communication antenna needs a floor plan of the building in which the antenna is to be positioned. In step 110, at least two horizontal lines are drawn on the floor plan of the building. A greater number of horizontal lines will increases the accuracy of the method. After drawing the horizontal lines, the process proceeds to step 102 where intersecting points between the horizontal lines and walls of the building are determined. A detailed explanation of this process will be given with reference to FIG. 2, which is a floor plan of a large apartment used for explaining the preferred embodiment of the present invention.

Figure 2:
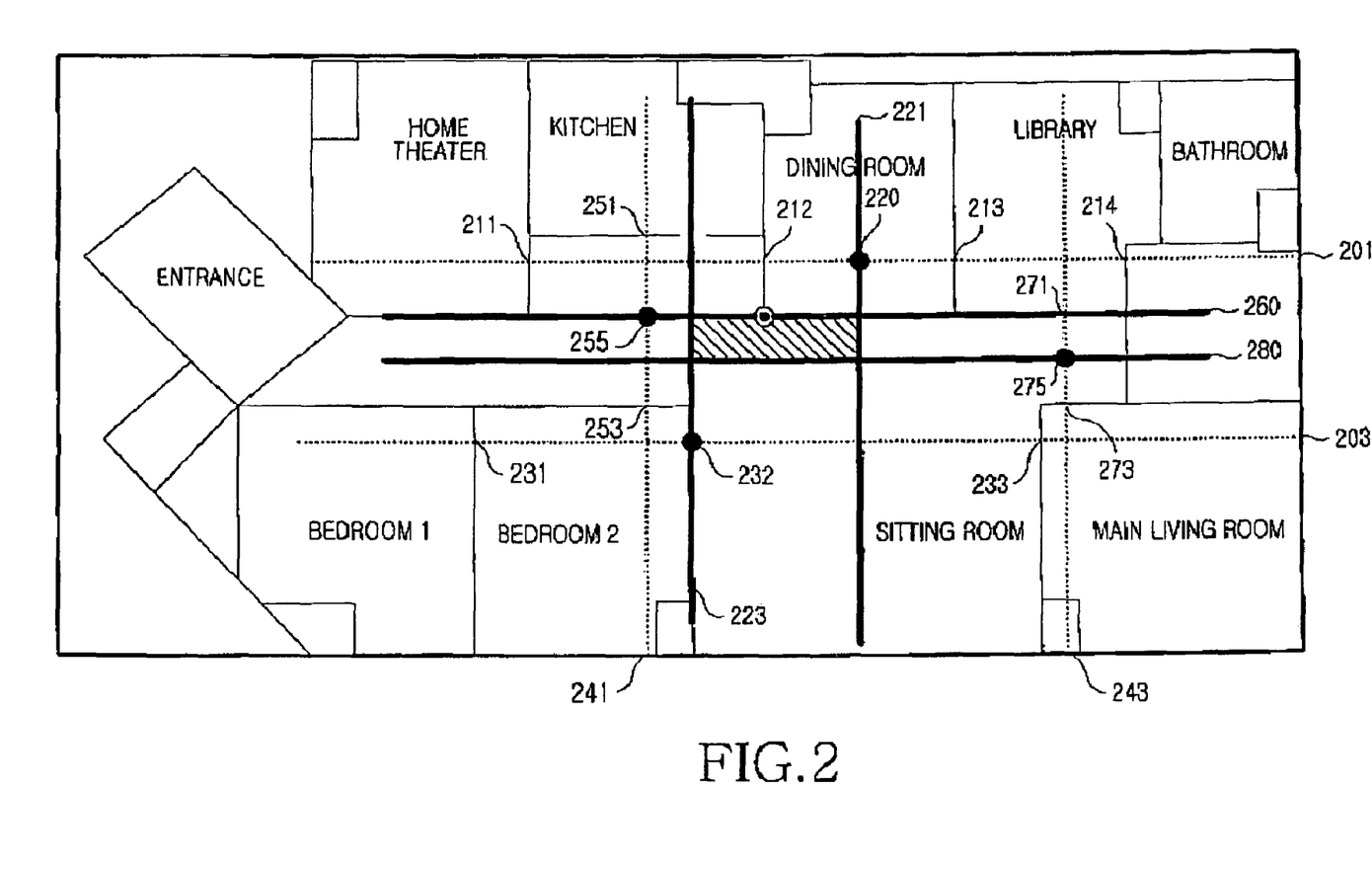
FIG. 2 is a floor plan of a large apartment used for explaining the preferred embodiment of the present invention.

As shown in FIG. 2, two horizontal lines 201 and 203 are drawn in accordance with step 100 of FIG. 1, which is the minimum required number. Considering a horizontal line 201, there are 4 intersecting points between the horizontal line 201 and the walls, as indicated by reference numerals 211, 212, 213 and 214. After this, a point designated by reference numeral 220 is marked at a center between two intersecting points designated by reference numerals 212 and 213. Next, in step 102, a vertical line with respect to the marked central point 220 is drawn as indicated by reference numeral 221. Similarly, there are 3 intersecting points between the horizontal line 203 and the walls, as indicated by reference numerals 231, 232 and 233. In this case, since the number of intersecting points between the horizontal line 203 and the wall is three, a point is marked at the intersecting point 232, which is the center of the three intersecting points 231, 232 and 233, and then a vertical line with respect to the marked point is drawn as indicated by reference numeral 223.

The preferred embodiment of FIG. 2 shown to have only two vertical lines is insufficient to explain step 104 of FIG. 1 where two central vertical lines of a plurality of vertical lines are selected. Therefore, in connection with step 104, an explanation will be given with reference to FIG. 3, which is another floor plan of a large apartment used for explaining the preferred embodiment of the present invention.

Figure 3:
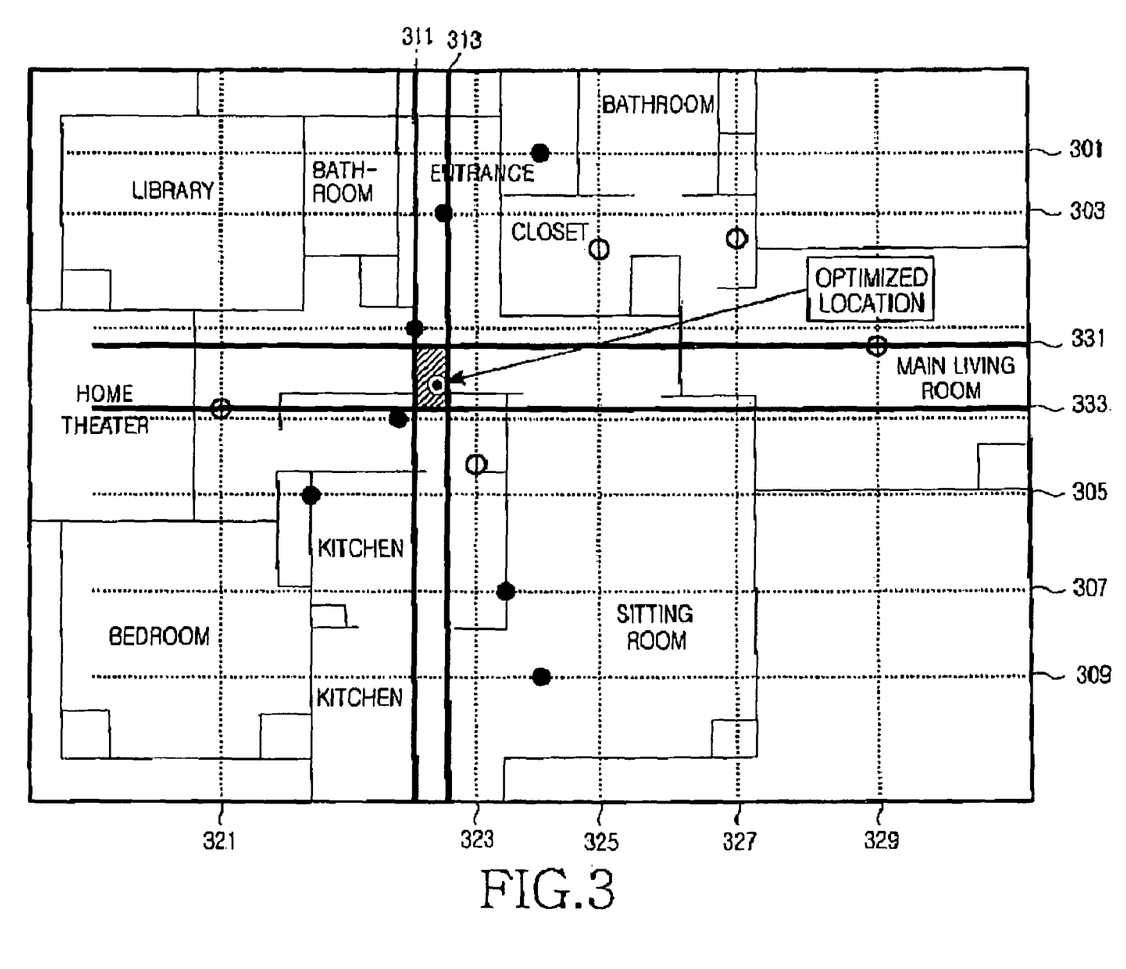
FIG. 3 is another floor plan of a large apartment used for explaining the preferred embodiment of the present invention.

In FIG. 3, five horizontal lines are drawn on the floor plan, as indicated by reference numerals 301, 303, 305, 307 and 309. In this case, central points of intersecting points between walls and the five horizontal lines are found, as described above, and vertical lines 321, 323, 325, 327 and 329 are drawn at the central points.

To determine the central points first intersecting points between walls are determined and a horizontal line or vertical line on a predetermined plan view. If the number of intersecting points is four (or an even number), a central point becomes a center of two middle intersecting points among the found four intersecting points, irrespective of the intervals.

For example, referring to a horizontal line 303, there are four intersecting points between walls and the horizontal line 303. There is one intersecting point where a right wall of a library intersects with the horizontal line 303, there is a second intersecting point where a right wall of a bathroom intersects with the horizontal line 303, there is a third point where a left wall of a closet intersects with the horizontal wall 303, and there is a fourth point where a right wall of second bathroom intersects with the horizontal wall 303. A central point is set between the second intersecting point and the third intersecting point among the above four intersecting points. However, if the number intersecting points is five (that is, an odd number), a central point is set at a third intersecting point placed in the middle of the five intersecting points.

If the number of the intersecting points is an even number, a central point becomes a center of the middle two intersecting points among the even number of intersecting points, and if the number of the intersecting points is an odd number, an intersecting point is placed in the middle of the intersecting points as a central point.

After drawing the vertical lines, in step 104, two vertical lines 311 and 313 positioned in the middle of the vertical lines allowing penetration of the radio wave through the wall are selected. Here, the vertical lines allowing the penetration of the radio wave through the walls will be described by way of examples as follows.

Based on a structure of the building, the number of horizontal lines intersecting the walls is adjusted within the maximum number of walls through which the radio wave can penetrate. For example, the maximum number of walls through which the radio wave can penetrate is three in the case of concrete or reinforced concrete, which is a representative material of the building, and is more than four in the case of materials such as wood or glass. Depending on this method, only two vertical lines positioned in the middle of the vertical lines allowing penetration of the wave radio through the wall are selected. The two selected central vertical lines can be shown as indicated by reference numerals 311 and 313 in FIG. 3.

After selecting the two vertical lines 311 and 313 as described above, the process proceeds to step 106 where the two vertical lines 311 and 313 are drawn on the plan view in the same manner as in step 102. This corresponds to two vertical lines 241 and 243, which is the minimum required number, for example, as shown in FIG. 2. Next, in step 108, intersecting points between the vertical lines 311 and 313 and the walls are determined, and then horizontal points are drawn at central points with respect to the intersecting points. Then, two intersecting points 251 and 253 with respect to a vertical 241 are found. Next, a central point 255 in the middle of the two intersecting points 251 and 253 is marked and then a horizontal line 260 is drawn with respect to the central point 255. There exist two intersecting points 271 and 273 on the vertical line 243. A horizontal line designated by reference numeral 280 is drawn with respect to a central point 275 in the middle of the two intersecting points 271 and 273.

Now, more than two vertical lines will be described with reference to FIG. 3. In FIG. 3, in step 108, five vertical lines 321, 323, 325, 327 and 329 are drawn on the floor plan. Central points based on the drawn vertical lines are found and vertical lines are drawn with respect to the found central points, respectively. After this, only two vertical lines of the vertical lines at positions through which the radio wave can penetrate remain. According to such a configuration, two horizontal lines 331 and 333 can be shown. Consequently, in both FIGS. 2 and 3, an intersecting square is formed which consists of two horizontal lines and two vertical lines. The intersecting square is shown as a diagonal-lined region in both FIGS. 2 and 3. When the intersecting square is determined, the least position for the antenna is at a possible central position within the intersecting square. However, it is necessary to position the antenna on the walls. Therefore, a wall nearest to the intersecting square can be the best place for positioning the antenna. At this time, if metal material such as a steel skeleton is present within the wall, it is preferable to position the antenna apart from the steel frame by a distance of 1 m or more.

After the wall on which the antenna is to be positioned has been determined, the process proceeds to step 112 where a tilt angle of the antenna and its height from a floor are determined. The height of the antenna can be selected to be the most convenient place depending on the tilt angle of the antenna. Deciding the tilt angle of the antenna is an important factor for positioning the antenna. The tilt angle of the antenna is determined according to the following Equation 1.

$$\Theta_{min} = \tan^{-1}(H/L) \quad (1)$$

where H is the height of the antenna from a floor, and L is the distance from a veranda, which is a factor to be considered. At this time, the setting height of the antenna can be adjusted depending on the tilt angle of the antenna.

Here, the reason for considering the tilt angle of the antenna is as follows. If an antenna does not have a tilt angle, a it may be possible that illegal interception of the signal can occur, such as interference or hacking, from homes other than a proper home. For example, an antenna without any tilt angle set on the first floor of an apartment can interact or interfere with an antenna set on an upper floor above the fifth floor of another adjacent apartment. In order to avoid this, a tilt angle of the antenna should be considered with a solution obtainable from the above Equation 1 at the time of positioning the antenna. The above Equation 1 is regarded to be adaptable for Korean environments where the distance between one apartment and another should be equal to the height of the apartment as specified under the Korean building act. If apartments are built closer to each other, the above Equation 1 should be modified to avoid interference or hacking between antennas positioned in one apartment and those positioned in another apartment.

In this way, when the position and the tilt angle of the antenna can be determined, the antenna is positioned at the position determined in step 114. At this time, if the antenna is to be embedded in the wall, the number of walls at which the horizontal lines and the vertical lines as described earlier with reference to the plan views of FIGS. 2 and 3 intersect with each other can be reduced. Therefore, considering this, a more preferable setting position of the antenna can be obtained.

According to the above-describe method of the present invention, it will be now appreciated that the position of a wireless communication antenna for use in the home can be easily determined by anyone if a floor plan of a building is available.

Figure 4:
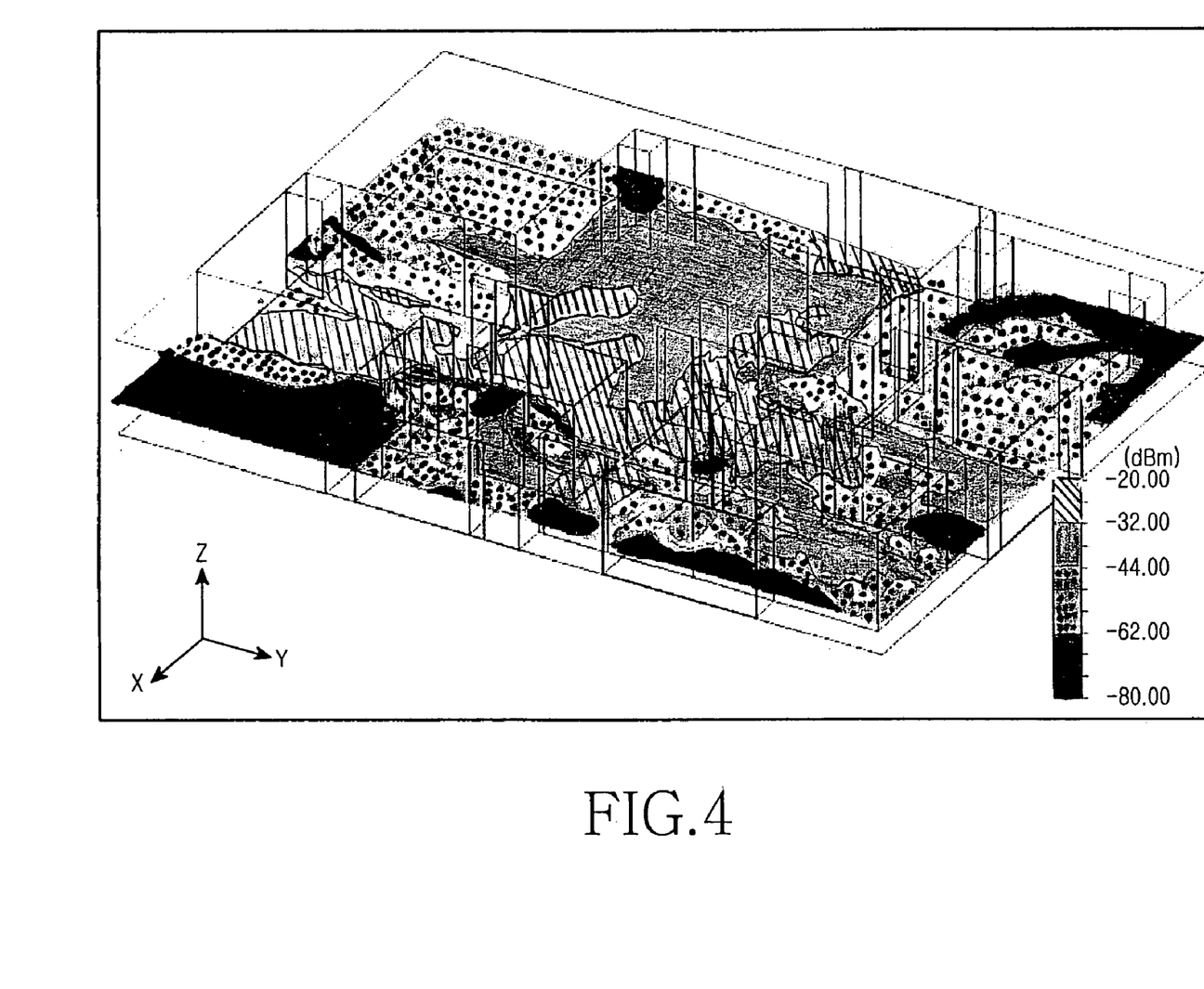
FIG. 4 is a three-dimensional diagram illustrating the simulated strength of an electric field in a home as shown in FIG. 2.
Figure 5:
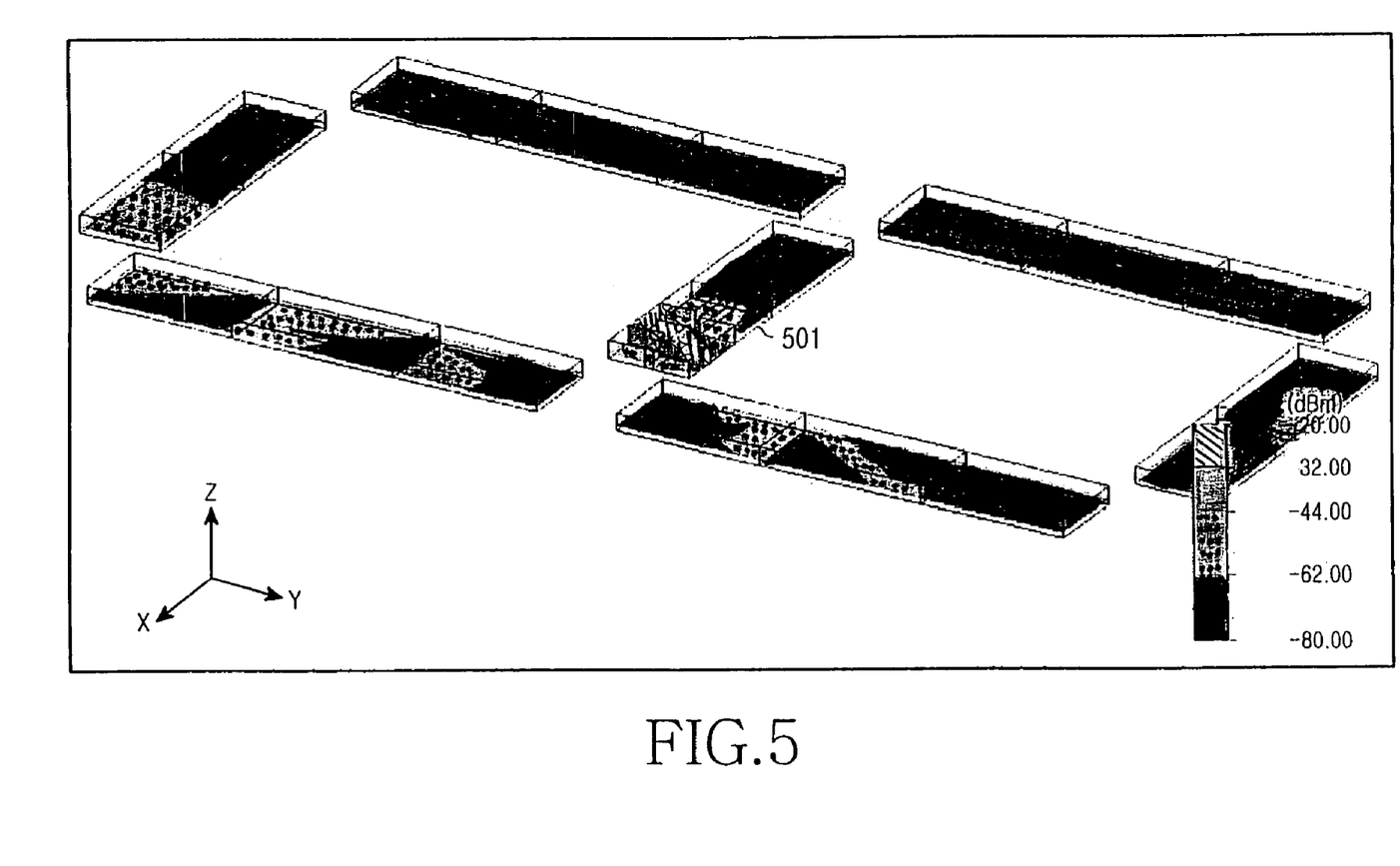
FIG. 5 is a diagram illustrating the strength of an electric field generated in an apartment together with that generated in an adjacent apartment, when interference of radio waves is not overcome.

When the antenna was positioned as described above, the resulting strength of an electric field in the home of FIG. 2 is shown in three-dimensions in FIG. 4. It can be seen from FIG. 4 that the strength of the electric field at any point inside the home is strong enough to achieve good communication, and, the strength of the electric field outside the home is very weak. FIG. 5 is a diagram illustrating the strength of an electric field generated in an apartment together with that generated in an adjacent apartment, when interference of radio waves is not overcome. Referring to FIG. 5, if a tilt angle and a position of an antenna of a home designated by reference numeral 501 are not properly not decided according to the above Equation 1, an electric field from the antenna spreads toward a very wide region, which may result in communication failure within other homes or undesirable hacking or communication troubles between homes.

Figure 6:
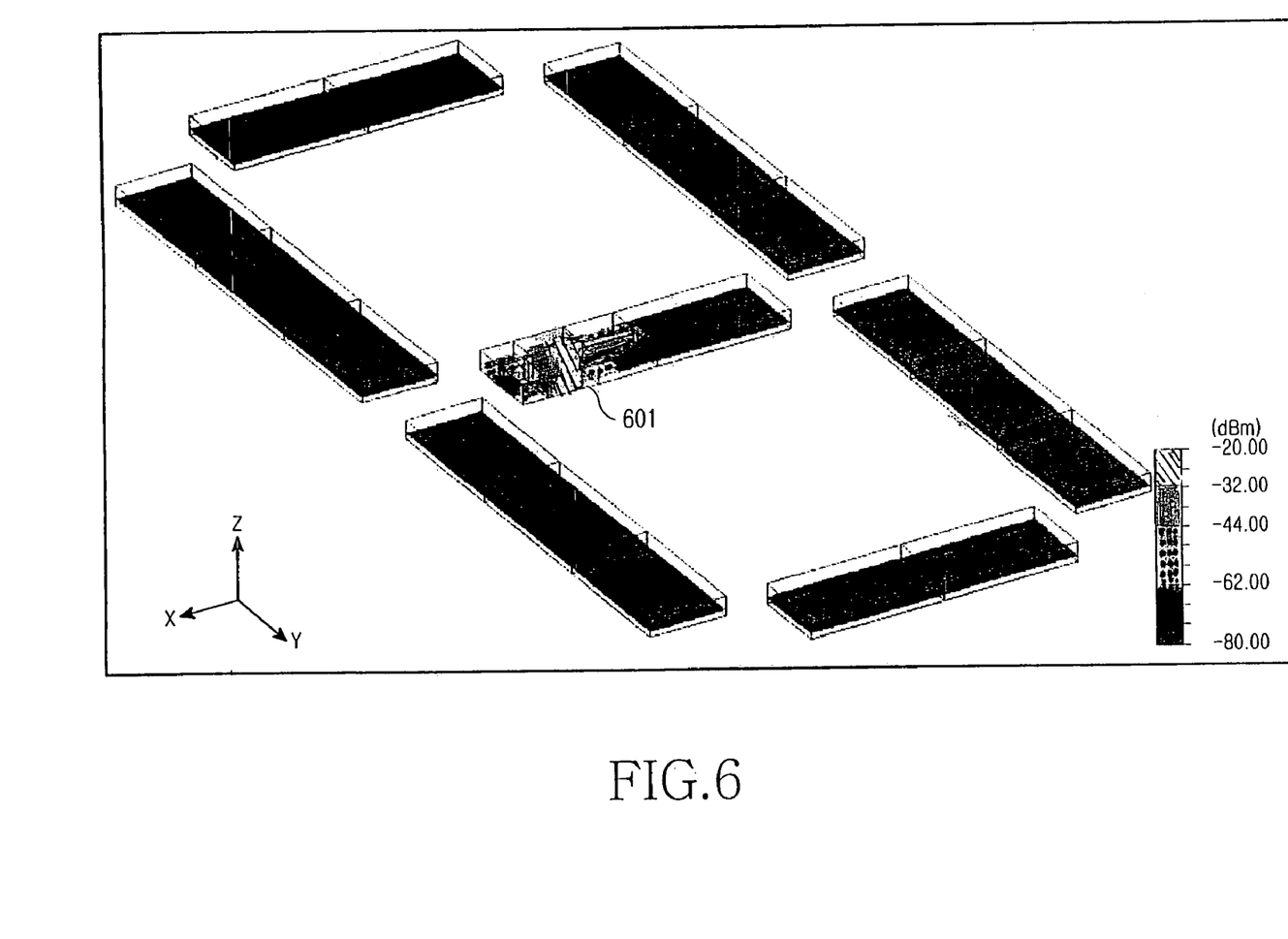
FIG. 6 is a diagram illustrating an electric field appearing in an adjacent apartment, when the position of an antenna is determined according to the present invention.

FIG. 6 is a diagram illustrating the strength of an electric field appearing in adjacent apartments, when an antenna is positioned in accordance with the present invention. It can be seen from FIG. 6, that the strength of the electric field becomes very weak outside home 601 where the antenna is positioned in accordance with the present invention, so that interference with antennas positioned in the adjacent apartments can be avoided.

As can be seen from the result of the simulation, the present invention provides a very effective method for positioning an antenna in a home, and provides a result similar to a result obtainable from execution of an algorithm applied when the antenna is set in a mobile communication system. In the case of a method for setting the antenna in the mobile communication system, an extremely processor-intensive program must be executed on a computer and factors regarding home environments should be input to the computer. It takes about one month to execute the program and verify the results of the execution in the field. However, the present invention requires about 10 minutes for an experienced person to position the antenna.

As apparent from the above description, the present invention provides an advantage in that an antenna of a wireless communication system for use in home can be positioned very quickly and precisely. In addition, according to the present invention, a position of the antenna is about the same as that obtained from the simulation by the computer, and smooth communication can be accomplished with no interference with antennas in other regions.

Although the preferred embodiments of the present invention have been disclosed for illustrative purposes, those skilled in the art will appreciate that various modifications, additions and substitutions are possible, without departing from the scope of the invention. Therefore, the present invention is not limited to the above-described embodiments and drawings.

What is claimed is:

1. A method for determining a position of an antenna of a wireless communication system for local area wireless communication, the method comprising the steps of:

drawing at least two first horizontal lines and at least two first vertical lines on a floor plan of a building and determining central points in the middle of intersecting points between the first horizontal lines and walls presented in the floor plan and between the first vertical lines and the walls;

for each of the found central points, drawing second horizontal lines from the central points if the central points lie on the vertical lines and drawing second vertical lines from the central points if the central points lie on the horizontal lines;

lines determining two third vertical lines and two horizontal lines in the middle of the drawn second vertical lines and the drawn horizontal second lines; and positioning the antenna at a position inside a square defined by the third vertical lines and the third horizontal lines.

2. The method as set forth in claim 1, wherein a tilt angle of the antenna is determined based on a height of the antenna from a floor and a distance from the position of the antenna to a specific area inside the home.

3. The method as set forth in claim 2, wherein the distance is a distance from the position of the antenna to a veranda inside the home.

4. The method as set forth in claim 1, wherein, if there exists a structure including metal material in the position of the antenna, the antenna is positioned at a predetermined distance from the structure.

5. The method as set forth in claim 1, wherein, if the antenna is embedded in a wall inside the home, the wall is excluded from the intersecting points.

6. The method as set forth in claim 2, wherein, if there exists a structure including metal material in the position of the antenna, the antenna is positioned at a predetermined distance from the structure.

7. The method as set forth in claim 2, wherein, if the antenna is embedded in a wall inside the home, the wall is excluded from the intersecting points.

* * * * *